United States Patent [19]

Guthrie

[11] Patent Number: 4,741,909

[45] Date of Patent: May 3, 1988

[54] BAG FOR PROCESSING FRUIT OR VEGETABLES

[76] Inventor: David W. Guthrie, P.O. Box V, Tonasket, Wash. 98855

[21] Appl. No.: 81,667

[22] Filed: Aug. 4, 1987

Related U.S. Application Data

[60] Division of Ser. No. 751,301, Jul. 5, 1985, Pat. No. 4,698,226, which is a continuation-in-part of Ser. No. 630,502, Jul. 13, 1984, abandoned.

[51] Int. Cl.$^4$ .................. B65B 29/00; B65B 25/04; B65D 65/16
[52] U.S. Cl. .................. 426/107; 426/112; 426/126; 229/3.5 MF; 383/103; 383/113
[58] Field of Search ............ 426/107, 87, 248, 383, 426/112, 126; 47/26, 28, 30, DIG. 6, 1 R, 84; 383/103, 113, 127; 229/3.5 MF

[56] References Cited

U.S. PATENT DOCUMENTS

| | | | |
|---|---|---|---|
| 383,327 | 5/1888 | Starr | 47/28 |
| 1,908,394 | 5/1933 | Wilson | 47/3 |
| 2,112,580 | 3/1938 | Skinner . | |
| 3,578,464 | 4/1967 | Mpelkas . | |
| 3,630,758 | 12/1971 | Despaln . | |
| 3,997,674 | 12/1976 | Ukai et al. | 426/90 |
| 4,006,561 | 2/1977 | Thoma et al. | 47/84 |
| 4,109,414 | 8/1978 | Kadkade | 47/58 |
| 4,147,291 | 4/1979 | Akao et al. | 426/107 |
| 4,159,596 | 7/1979 | Downing | 47/58 |
| 4,196,544 | 4/1980 | Davis et al. | 47/DIG. 6 |

FOREIGN PATENT DOCUMENTS

| | | | |
|---|---|---|---|
| 581773 | 8/1959 | Canada | 426/107 |
| 765392 | 12/1933 | France | 47/26 |
| 6157 | 9/1955 | Japan . | |
| 85331 | 11/1973 | Japan . | |
| 18618 | 2/1974 | Japan . | |
| 49-27773 | 7/1974 | Japan | 47/26 |
| 105430 | 8/1975 | Japan . | |
| 118449 | 9/1976 | Japan . | |
| 136944 | 11/1976 | Japan . | |
| 20376 | 6/1977 | Japan . | |
| 122540 | 10/1977 | Japan . | |
| 158040 | 12/1977 | Japan . | |
| 107544 | 8/1978 | Japan . | |
| 47830 | 12/1978 | Japan | 47/26 |
| 18451 | 2/1979 | Japan . | |
| 42888 | 12/1979 | Japan . | |
| 34995 | 8/1981 | Japan . | |
| 57-59725 | 12/1982 | Japan | 47/28 R |
| 886761 | 11/1962 | United Kingdom | 426/107 |
| 1031035 | 5/1966 | United Kingdom | 426/107 |

Primary Examiner—Steven Weinstein
Attorney, Agent, or Firm—Seed and Berry

[57] ABSTRACT

Methods and apparatus are disclosed incorporating a design into the skin of a apple or other fruits or vegetables with a photochemically reactive skin or surface by covering the apples while still on the tree with a bag having a reflective outer surface and a non-reflective inner surface. The bag has at least one aperture to allow for the drainage of fluids out of the bag, and further has a light barrier positioned to block light from entering through the aperture into the interior of the bag. The bagged apples are harvested and transferred to a substantially light-exclusive environment where the bag is removed. A label or symbol is applied to the skin of the apple or fruit and the apple or fruit exposed to artificial light to develop the color of the skin of the apple.

6 Claims, 1 Drawing Sheet

U.S. Patent
May 3, 1988
4,741,909
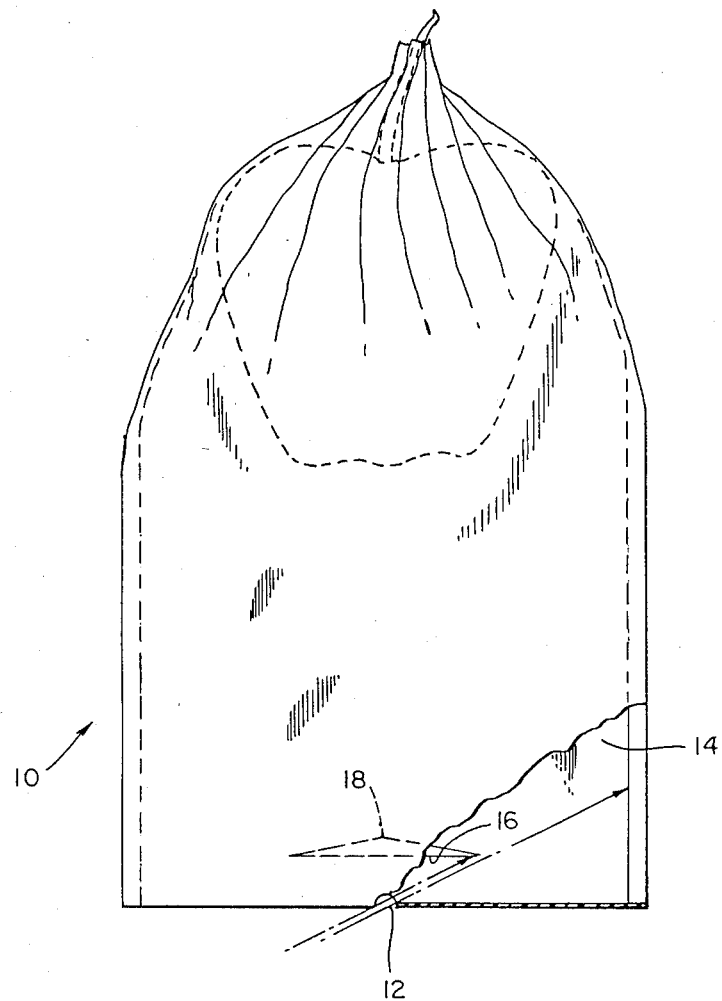

BAG FOR PROCESSING FRUIT OR VEGETABLES

CROSS REFERENCE TO RELATED APPLICATION

This application is a divisional of U.S. patent application Ser. No. 751,301, filed July 5, 1985, now U.S. Pat. No. 4,698,226, which application is a continuation-in-part of applicant's application Ser. No. 630,502, filed July 13, 1984, now abandoned.

DESCRIPTION

1. Technical Field

The present invention relates to methods of decorating fruit and more specifically, to methods of incorporating a design into the surface of an apple and a reusable bag for use in connection therewith.

2. Background Art

It is known in Japan to incorporate a design into the surface of an apple where the apple is first wrapped with several layers of paraffin paper and then subsequently wrapped with an outer layer of newspaper. Approximately 30 to 50 days prior to harvesting the apple, the bags are removed, a logo is placed on the skin of the apple, and sheets of foil are unrolled on the ground beneath the apples to reflect sunlight upward, thereby coloring the fruit. In addition, up to 50 percent of the leaves on the trees are picked in an attempt to ensure that an adequate amount of light reaches the fruit.

This method, in addition to being tedious, expensive, and labor intensive, has several other disadvantages. The paraffin paper covering is not suitable for reuse, and, in unfavorable weather, the covering acts as a host for the growth of mold upon the apple. Due to the relatively long period of time the covering remains on the apple, it is attractive to infestation by insects and interferes with insecticide spraying programs, which are invaluable from a commercial standpoint.

In addition, the use of reflective foil on the ground beneath the apples to evenly color the fruit creates an undesirable dependence upon favorable weather conditions as well as being prohibitively expensive. Further, when large numbers of leaves are picked from a tree, the ability of the tree to store energy through photosynthesis is greatly reduced. This becomes particularly important as the tree enters its dormant period subsequent to fruiting, when stored energy is essential for survival.

The present invention provides a method which substantially eliminates the disadvantages noted above as well as providing other related advantages which will become apparent upon reading the following detailed description and through reference to the attached drawings.

DISCLOSURE OF THE INVENTION

Briefly stated, the present invention discloses methods for incorporating a design into the skin of an apple as well as other fruits and vegetables whose skin or surface is photochemically reactive, such that the skin or surface changes color when exposed to light.

In one aspect of the invention, the apple is covered while still on the tree with at least one bag having a reflective outer surface and a non-reflective inner surface. The bag has an open proximal end adapted to fit over and substantially surround the fruit, and a distal end having at least one aperture communicating with the interior volume of the bag to allow the drainage of fluids therethrough to the exterior of the bag. The bag is further provided with a light barrier located at the distal end inward of the aperture, the light barrier being positioned to block light from entering through the aperture into the interior volume of the bag.

The apple or fruit is preferably covered with the bag before it begins to develop its natural color. After a period of time, the fruit is harvested and transferred with the bag thereon to a substantially light-exclusive environment. The bag is removed, a label or symbol applied to the fruit, and the fruit exposed to an artificial light source such that the exposed skin of the apple develops its natural color.

In another aspect of the invention, a bag with the characteristics described herein is applied to the fruit as noted above. After a period of time, the bag is removed and an opaque label or symbol applied to the skin or surface of the fruit while the fruit is still on the tree. The fruit is then exposed to natural light such that the exposed skin of the fruit develops its natural color.

In all of the methods noted above, upon removal of the label or symbol from the skin of the apple after the exposed skin has developed its natural color, an attractive design will be revealed which has been incorporated into the skin of the apple.

Yet another aspect of the invention discloses a method of ensuring the consistent production of a quality apple, comprising (a) covering the apple while on the tree with a bag having a reflective outer surface and a nonreflective inner surface, the bag having an open proximal end adapted to fit over and substantially surround the apple, a distal end having at least one aperture communicating with the interior volume of the bag to allow the drainage of fluids therethrough to the exterior of the bag, and a light barrier located at the distal end inward of the aperture and positioned to block light from entering through the aperture into the interior volume of the bag; (b) harvesting the apple and transferring it to a substantially light-exclusive environment; and (c) exposing the apple to an artificial fluorescent light source such that the apple develops its natural color, whereby the sugar content, acid level, and skin pressure are not substantially affected by the exposure to the artificial light.

BRIEF DESCRIPTION OF THE DRAWING

The FIGURE is a side elevational view, with a portion broken away, of a bag used within the present invention.

BEST MODE FOR CARRYING OUT THE INVENTION

According to the present invention, a design may be incorporated into the skin or surface of an apple, or other fruits or vegetables whose skin or surface is photochemically reactive, such that the skin or surface changes color when exposed to light, by first blanching the apple or other fruit by wrapping or covering it with a bag which is impervious to light, and then subsequently removing the bag and applying an opaque sticker, label, or symbol to the surface of the fruit. The exposed skin of the fruit is then allowed to develop its natural color through exposure to artificial light, while the covered portion remains blanched. Upon removal of the sticker, label, or symbol, an attractive, substantially contrasting design is revealed which has been incorporated into the skin of the fruit. In addition to apples, other fruits or vegetables which may be utilized include oranges, pears, watermelons, pomegranates, and cucumbers.

Referring now to the FIGURE, it is preferably in the method of the present invention to use a single bag structure 10, although multiple wrappings or coverings may be utilized. The bag 10 should be weatherproof and should be fashioned with at least one hole or aperture 12 at its bottom or distal end to allow condensed moisture to drain from the bag. As shown in the FIGURE, in order to prevent light from reaching the interior volume 14 of the bag through the aperture 12, thereby coloring the fruit, the bag 10 is provided with a light barrier 16 located inward of the aperture. The light barrier 16 is positioned so as to block light from entering through the aperture into the interior volume of the bag while allowing the passage of fluids from the interior volume of the bag to the aperture. To facilitate the passage or flow of the accumulated moisture or fluid, it is preferable to form the barrier with a centrally raised portion 18, the angle created by the portion being sufficient to direct the moisture toward the aperture.

The bag 10 may be composed, for example, of a vacuum-metallized polyester film, or preferably, the combination of a light reflective vacuum-metallized polymer film laminated to an opaque black polymer film, the latter forming the inner surface of the bag and being non-lightreflective. The bag should be substantially, if not completely, opaque to sunlight with a minimum reflectivity of 80 percent, but preferably 90 percent or more.

The use of an outer surface with such reflectivity assists in maintaining a reduced temperature for the apple, usually around 70°–75° F. This is important since apples optimally synthesize sugar at approximately 72° F. This maintenance of temperature functions as an artificial stimulus, causing an increase in the sugar content of the apples, making them taste more desirable. Further, a higher sugar content helps the apples to last longer, since actual deterioration of the apple will not occur until the sugar has broken down into starch. This latter feature allows the apples to be well suited for long-term, controlled atmosphere storage (usually 32° and 0–1% oxygen, remainder nitrogen). It has also been realized, through the use of these bags, that the apples may be colored before or up to approximately 6 to 8 months after being placed in controlled atmosphere storage. This fact benefits growers of apples in general, since they are not required to leave the apples on the trees longer than is advantageous to achieve proper skin pressure, sugar level, and acid level while attempting to achieve a desirable color grade. As compared to the compared prior art, which allowed an attempt to apply a design on only a single selected day, the present invention allows an individual to apply a design up to approximately 120 days after the apple has been harvested. Due to the reverse climatic conditions in the nothern and southern hemispheres, fruit may be selectively covered up to approximately 240 days per year.

In addition to stimulating a higher sugar content within the apples, the reflective nature of the bag described above increases photosynthesis, thereby increasing the growth rate of the tree. This aids in increasing the size of the fruit, as well as allowing the tree to store more energy in its roots in the form of carbohydrates, thereby resulting in a healthier tree the subsequent season. When a metallized film is used, it is preferable to provide a substantially clear plastic coating over the metallized film in order to keep it from deteriorating.

Although the size and thickness of the bags may vary, a suitable thickness is approximately 0.5 to 1.0 mm, while a suitable size pouch-type bag would have dimensions of approximately 7 inches by 10½ inches. Once the bag is placed over the apple, with the metallized surface on the outside of the bag, it may be secured to an adjacent stem through the use of a conventional waterproof twist-tie which is approximately 8 inches in length. When the bag is used in this manner, it effectively protects the apple from hail, sunburn, insect damage, and limb rub.

In the preferred embodiment of the invention, the bags may be applied to the apples at any time between 30 days, or just after natural drop of the bloom occurs, to 90 days post-bloom or before the apple begins to develop its natural color, although it is preferable to apply the bags approximately 45 days post-bloom. The bags remain on the apples during harvesting, and the bagged apples are transferred from the tree to a substantially light-exclusive environment, such as a packing shed. The bag ensures that the skin of the apple will remain blanched, while protecting the apple during harvesting and transfer by acting as a cushion.

Once the apples are within the shed, the bags are removed and an opaque sticker, label, or symbol applied to the blanched skin of the apple. The label may be applied manually or through the use of automated labeling equipment. It is preferable to use a label which has an opaque reflective surface and an adhesive backing so that it may be temporarily fixed to the skin or surface of the apple. Suitable substrates for the label include materials such as vinyl or paper.

Alternatively, the label may be applied in the form of plastic wrap which adheres to the fruit, commonly referred to as "shrink-wrap," with an ink design sprayed or otherwise applied onto the surface of the shrink-wrap. Within this alternative, it is preferable to utilize a printer such as the "plate impression printing system" manufactured by FMC Corporation, Chicago, Ill. Further, by using an automated shrink-wrap machine, such as the D-super shrink-wrap machine or the WA-120 shrink-wrap machine manufactured by FMC Corporation, in conjunction with a printer, it is possible to process approximately 40–80 apples per minute. Although not essential, it is also preferable within this alternative to utilize an ink which may be easily removed from the shrink-wrap, as by washing or buffing. This allows an eventual consumer to see a design on the apple (after exposure of the apple to artificial light as described later) while concurrently increasing shelf life and reducing labor costs, since it is not necessary to remove the shrink-wrap. Suitable inks or paints which could be applied to the shrink-wrap include those with an acrylic, oil, enamel, or water base.

Subsequent to placing the label or symbol on the skin of the apple, the apple is exposed to an artificial fluorescent light source such that the exposed or uncovered skin of the apple will develop its natural color. It is preferable to expose the apples to a light source with an intensity of at least 500 foot-candles at a distance of 12 inches for a period of approximately 72 hours, periodically rotating the apple until it is fully colored. By using mirrors or other reflective material, the number of times which the apple must be rotated can be substantially reduced.

The apples may be exposed to the fluorescent light source in a number of ways. For instance, the apples may be placed upon a substantially clear glass or Plexiglas surface with fluorescent lights arranged both above and below the apples or, alternatively, the apples may be placed on a series of rollers or conveyors which function to slowly rotate the apples, thus eliminating manual rotation, and necessitating only a single fluorescent light source. Since blanched apples are extremely susceptible to sunburn, the use of artificial fluorescent light provides a degree of control which is very desirable. This degree of control further allows an individual to interrupt the coloring process at virtually any stage, resulting in an apple whose skin is anywhere from deep red to light pink, the latter color being particularly preferred by a substantial segment of the consuming public.

It is also preferable to maintain an air temperature of approximately 70°-75° F. in order to establish an optimal environment for the coloration of the apples. The ability to control the air temperature surrounding the apples is advantageous since apples will not color properly if the temperature of the air falls below 45° F. or rises above 86° F.

When exposed to fluorescent light by means of any of the arrangements just described, the exposed skin of the apple develops its natural color in approximately 72 hours. It will be apparent to one skilled in the art that different shades of color may be obtained by altering the time of exposure. For instance, a pink color may usually be achieved through exposure for approximately 24 hours. After the apples have become fully colored, the labels may be removed and the apples stored in a suitable environment for sale at a later date.

An alternative embodiment includes applying a bag having the characteristics described above to the apple in a manner identical to that noted above, and subsequently removing the bag and applying the sticker, label or symbol to the skin or surface of the apple while the apple is still on the tree. It is preferable to remove the bag and apply the label or symbol to the surface or skin of the apple approximately three weeks prior to harvesting the apple so that it will be exposed to an adequate amount of natural light to cause the apple to develop its natural color. When using natural sunlight to color a blanched apple, the label or symbol should be opaque and provided with a reflective coating, and special care should be taken to avoid sunburning the skin of the apple. For instance, it is preferable when practicing this embodiment, to only utilize apples which are on the inner part of the tree so as to take advantage of the natural shading provided by the leaves of the tree. After the exposed skin of the apple has developed its natural color, the apple may be harvested and the label or symbol removed from the apple.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A bag for use in incorporating a design into the skin or surface of a fruit or vegetable, comprising:

a bag having a light reflective outer surface and a non-lightreflective inner surface, said bag having an open proximal end adapted to fit over and substantially surround said fruit, a distal end having at least one aperture communicating with the interior volume of said bag to allow the drainage of fluids therethrough to the exterior of said bag, and a light barrier located at the distal end inward of said aperture, said light barrier positioned to block light from entering through said aperture into the interior volume of the bag, such that said outer and inner surface in combination with said light barrier maintains said fruit or vegetable within a substantially light exclusive environment.

2. The bag of claim 1 wherein the outer surface of the bag is composed of a metallized polymer.

3. The bag of claim 2 wherein said metallized polymer surface has a substantially clear plastic coating thereon.

4. The bag of claim 1 wherein the inner surface of the bag is composed of a non-lightreflective polymer.

5. The bag of claim 1 wherein said light barrier has a centrally raised portion to facilitate the flow of fluid from the interior volume to said aperture.

6. The bag of claim 1 wherein said outer surface has a minimum light reflectivity of 80 percent.

* * * * *